United States Patent Office 3,474,139
Patented Oct. 21, 1969

3,474,139
PREPARATION OF RING-HALOGENATED ARYLSULFENYL HALIDES
Joseph Leib, Montreal, Quebec, Canada, assignor to Domtar Limited, Montreal, Quebec, Canada, a Canadian company
No Drawing. Filed Dec. 23, 1963, Ser. No. 332,833
Claims priority, application Canada, Dec. 22, 1962, 865,222
Int. Cl. C07c *145/00, 149/34*
U.S. Cl. 260—543        13 Claims

ABSTRACT OF THE DISCLOSURE

The present invention relates to the formation of sulphenyl halides halogenated on the ring to a controlled degree by reacting mononuclear aromatic thiols or disulphides in an anhydrous medium with a halogenating agent in the presence of a catalyst.

---

The present invention relates to the preparation of aromatic sulphenyl halides and derivatives therefrom. It relates, more particularly, to the preparation of halogenated aromatic sulphenyl halides and derivatives therefrom from aromatic thiols or disulphides.

Aromatic sulphenyl chlorides halogenated on the ring are useful chemical intermediates leading to products having a variety of established or potential uses. By simple reduction of some sulphenyl chlorides of this invention, for examples, chlorinated aromatic thiols are obtained which are useful in many applications, e.g. in the rubber industry, in pharmaceuticals, bio-cides, and the like. The known versatility of sulphenyl chlorides as intermediates can be utilized, by means of this invention, to introduce the chloroaryl-thio group on to various compounds, as set out hereinbelow. The starting materials in this invention are aromatic thiols and disulphides and this process provides a means for upgrading these materials, generally considered a waste product in the petroleum industry.

Heretofore, ring chlorinated aromatic thiols and sulphenyl chlorides have been made by roundabout methods, the starting material for which has been generally an aromatic compound already chlorinated on the ring. The chloro-aromatic compound serving as starting material is usually sulphonated and the chloro-sulphonyl aromatic compound then reduced to the chloro-aryl thiol. Alternatively, the chloro-aromatic compound is nitrated and the nitro function reduced in several steps, e.g. to form first a chlorinated amino-aromatic compound, then a diazonium compound, a xanthate, and finally a thiol. In some cases chloro-aromatic compounds are made to react at high pressure and high temperature with an alkali sulphide or bisulphide in an alcoholic medium; this method is almost wholly confined to tetra-, penta-, and hexachlorobenzene and results in tri, tetra-, and penta-chlorobenzene thiols. These are all cumbersome methods, involving losses at each step and resulting finally in a chloroaromatic thiol from which the corresponding sulphenyl chloride has still to be prepared, if it is desired to use a sulphenyl chloride for the facile introduction of the chloroaryl-thio group into other substrates.

It is an object of this invention to provide a simple method of preparing ring-halogenated aromatic sulphenyl halides from aromatic thiols and disulphides.

It is another object of this invention to provide a simple method of preparing useful chemical compounds containing in their structure the halo-aryl-thio group. It is a particular object of the invention to provide a simple method of preparing ring-halogenated aromatic thiols.

It is another object of this invention to provide useful chemical intermediates from waste material containing aromatic thiols and disulphides.

Other objects of the invention will become apparent from the description hereinbelow.

According to this invention an aromatic thiol or disulphide in solution or suspension in a solvent is treated with a halogenating agent in the presence of a catalyst until a halogenated aromatic sulphenyl halide is formed having the desired degree of ring halogenation.

The halo-aromatic sulphenyl halide may then be reduced to the corresponding thiol or reacted with other reactive compounds to introduce therein the halo-aryl-thio group.

The aromatic thiols and disulphides suitable in the process of this invention are those corresponding to the general formulae, respectively, ArSH and Ar—S—S—Ar′ wherein Ar represents an aryl or substituted aryl, the substituents being such as would not be attacked by chlorine in preference to ring carbons and Ar, Ar′ are the same or different aryls or substituted aryl groups. Thus, suitable thiols and disulphides will include those containing as the aryl group: phenyl, nitro-phenyl, lower alkyl-phenyl, chloro-alkyl-phenyl, chloro-phenyl, fluorophenyl and groupings like $ClSO_2C_6H_4$—, $Cl$—$COC_6H_4$—, $CH_3CONHC_6H_4$—, and the like. As aromatic disulphides are generally solids, a solvent will necessarily be used in the chlorination of these compounds, but also in the case of liquid thiols the reaction is preferably carried out in solution in a suitable solvent. Suitable solvents include primarily carbon tetrachloride and chloro-benzene, but other chlorine-resistant solvents can be used, e.g. methylene chloride, chloroform, ethylene dichloride, trichloroethylene, tetrachloroethane and the like. Since sulphenyl chlorides are very reactive and sensitive to moisture utmost care must be taken to maintain dry conditions during the reaction. Thus the solvent, after being charged to the reaction set-up, is briefly refluxed to drive off any moisture in the form of low-boiling azeotropes.

The halogenating agent preferred in the reaction is chlorine gas, or where bromination is intended, bromine. Dry chlorine is passed into the solution (or suspension) of the thiol or disulphide and the passage is continued, while a check is being maintained on the weight gain of the solution as the reaction proceeds, until the desired degree of ring-chlorination is achieved. The degree of chlorination is indicated by the gain in weight, the latter serving as the indicator for control of the reaction. Sulphuryl chloride can also be used as chlorinating agent.

The reaction is carried out in the presence of a catalyst. Broadly, catalysts of the group known as halogen carriers, the group including iodine, metals and metal halides, are suitable; also certain organic and inorganic acids are used in this reaction. Preferred use is made of fuming sulphuric acid, the quantity of acid used being between a fraction of a gram to several grams per mol of thiol or disulphide. Other effective catalysts are: iodine, benzene sulphonic acid, p-chlorobenzene-sulphonic acid, alkane sulphonic acids, antimony pentachloride, and the like. All degrees of chlorination can be obtained in the presence of a catalyst; thus where Ar of the starting thiol or disulphide is an unsubstituted phenyl group, chlorination proceeds up to and including the stage of penta-chloro-phenyl sulphenyl chloride. The monochlorinated compound can be obtained also in the absence of a catalyst, however, the time of reaction in such cases is very considerably extended. The reaction can be carried out at room temperature, but when a polychlorinated product is desired it may be advantageous to operate at somewhat higher temperatures, e.g. between room temperature and about 80° C., provided that the operating temperature is below the boiling point of the solvent used. The chlorinations, particularly in the initial stages, are exothermic, and from time to time cooling may be required to avoid excessive lowering of the chlorine inflow. However, the rate of chlorine uptake generally decreases with the amount of chlorine taken up, as is common in aromatic ring chlorination; hence the use of higher temperatures for higher degrees of chlorination may compensate partly for the fall in rate, and prevent the loss of unreacted chlorine. Generally, when the chlorine is only loosely controlled by means of a flowmeter, some over- or under-chlorination may occur with respect to the exact degree of chlorination desired, in which case minor amounts of the over- or under-chlorinated product will have to be separated, e.g. in a distillation column, from the major product. However, exact methods of controlling the amount of chlorine absorbed, e.g. by continuous weighing methods or the like, will be obvious to those skilled in the art.

It is belived that in a first stage of the reaction an unsubstituted sulphenyl chloride is formed, followed in rapid sequence by ring chlorination, the outcome being a ring-chlorinated sulphenyl chloride of the degree of chlorination desired. The formation of these ring-chlorinated sulphenyl chlorides is virtually quantitative; it is during the handling and reduction of these very reactive intermediates that losses occur. Under carefully controlled conditions, the sulphenyl chlorides can be separated, e.g. by distillation in high vacuum, with relatively little loss, and the purified product can be stored, at least for several days, without serious decomposition. The greater the number of negative substituents on the sulphenyl chloride, the more stable it is. A more convenient method of storing, however, will be to convert the sulphenyl chloride to the corresponding thiol which is stable, can be stored indefinitely and can, when needed, be reconverted to the sulphenyl chloride, when the high reactivity of the latter is to be made use of.

In many cases, however, the sulphenyl chloride of this process will be used as intermediates and will be reacted with other compounds immediately upon formtion. Thus, the present process provides a method for the production of ring chlorinated thiols by a simple reduction of the sulphenyl chlorides obtained as hereinabove described, the reduction being effected by any of a number of known methods, e.g. by zinc in acetic acid, or a like method (provided hydroxylic media are not used). But it is also possible to react the sulphenyl chlorides obtained in this invention with a wide variety of compounds, notably with those having an "active" hydrogen or with metalloorganics, whereby a variety of compounds containing the chloro-aryl-thio group can be prepared. Examples of such reactions are:

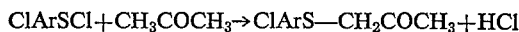

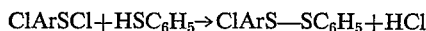

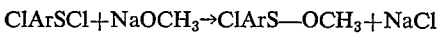

The sulphenyl chlorides can also add across multiple bonds as in

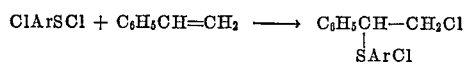

or it can act in a way analogous to an acid chloride in a Friedel Crafts reaction to substitute an aromatic hydrogen, e.g. with phenols to form phenol sulphides, thus

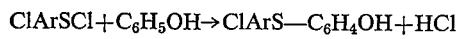

It is thus possible to form a great number of derivatives starting from the chlorinated sulphenyl chlorides obtained in this invention. It will be appreciated that these derivatives have a great variety of applications either by themselves or as intermediates for the preparation of still other compounds having useful properties, e.g. as antioxidants, herbicides, dye intermediates, resin modifiers, lubricating oil additives etc. Some ring chlorinated thiols, e.g. p-ClC$_6$H$_4$SH, are well established industrial materials used in the manufacture of insecticides. Acetic acid derivatives or aromatic thiols have known uses as herbicides, and may also be used as intermediates in the fabrication of thio-indigo dyes; or else, with high boiling alcohols, may form esters useful as antioxidants and non-flammable plasticizers.

The process of this invention provides a simple and inexpensive route to these compounds, by providing a method of preparing the intermediate ring-halogenated aryl sulphenyl chloride from materials having otherwise very limited use, viz: aromatic thiols and disulphides. Surprisingly, the method of this invention permits the simultaneous halogenation of the ring and the introduction of any desired number of halogens (up to the maximum of five in the case of unsubstituted phenyl), onto the ring, the halogenation being easily controllable by control of the weight of chlorine reacted.

The following examples are given to further illustrate the invention. For convenience, most of the experiments have been roughly regulated by metering the amount of chlorine passed in, using a flowmeter. In practice, this has resulted in under- or over-chlorination, so that the desired product has usually been accompanied by relatively small amounts of products containing one chlorine atom more or one chlorine atom less than the main product desired, eventually necessitating a separation by distillation. The product can be and in some cases has been here more narrowly restricted to the desired degree of chlorination by a weight gain method of controlling the extent of reaction.

Example 1

A one-liter, three-neck flask was provided with a gas-tight stirrer, a thermometer, a dispersing inlet tube for chlorine gas, and an effluent tube leading through a condenser and drying tube to a ventilating hood. This apparatus, weighed and suitably dried, was charged with 109 g. (0.5 mole) of purified diphenyl disulphide and 600 g. of dry carbon tetrachloride under vigorous stirring, about 2 g. of 30% fuming sulphuric acid were added dropwise. A stream of dry chlorine gas was metered in, maintaining a temperature near room temperature by use of a cooling bath. Passage of chlorine was continued, for about 3 hours in this case, until a small excess over the amount required for quantitative formation of chlorobenzene sulphenyl chloride, ClC$_6$H$_4$SCl, had been introduced. The flow of chlorine was stopped, and stirring was continued to allow the reaction of dissolved and still unreacted chlorine to proceed. When the reaction was completed (best determined by following weight gain) the liquid was decanted from the residual catalyst complex. Carbon tetrachloride was removed under vacuum, leaving a residual sulphenyl chloride, which was identified as ClC$_6$H$_4$SCl, B.$_5$ 88°–90° C. This was dissolved in about 300 cc. of glacial acetic acid, and zinc dust was gradually added, and the addition continued until some zinc remained undissolved in the near-boiling solution. The mixture was then refluxed for about 3 hours, adding more zinc when necessary: during the last half hour of this period about 30 ccs. of concentrated hydro-chloric acid was added to discourage any build-up of zinc mercaptides. The final mixture was cooled and poured into much water. The separated thiol product was taken up in benzene, washed, dried, and distilled.

Yield of chlorobenzene-thiol was about 95%. Analysis, with the aid of infrared, vapor phase chromatography, and the preparation of —SCH$_2$COOH derivatives, showed this to consist of about 85% of p-chlorobenzene thiol and about 15% o-chlorobenzene thiol.

When the reduction step was carried out without removing the carbon tetrachloride and in the absence of acetic acid, the reduction proceeded only to the disulphide stage, and the products were the corresponding ring-chlorinated disulphides. These "intermediate" disulphides were also obtained, in a few cases, by adding an alcohol (e.g. methanol) to the carbon tetrachloride solution of the sulphenyl chloride, and refluxing; or by adding pyridine, and refluxing; or by adding the corresponding thiol (or indeed, another aryl thiol) and refluxing.

Example 2

The process was carried out as in Example 1, except that the disulphide was replaced by an equivalent amount of benzene thiol as starting material. Approximately the same yield of the same product was obtained.

Example 3

The process was carried out as in Example 1, except that the temperature was about 40° C. and chlorination was continued until sufficient chlorine had been taken up to form a di-chlorobenzene derivative. After subsequent reduction, as in Example 1, a nearly quantitative conversion to a thiol product was achieved. Analysis showed that about 90% of this thiol product was dichlorobenzenethiol ($Cl_2C_6H_3SH$), the remainder being mainly $p-ClC_6H_4SH$.

The $Cl_2C_6H_3SH$ was found to be almost wholly the $2,4-Cl_2C_6H_3SH$ isomer, containing less than 5% $2,6-Cl_2C_6H_3SH$.

Example 4

The process was carried out as in Example 1, except that the temperature was about 60° C. and chlorination was continued until sufficient chlorine had been taken up to form a tri-chloro derivative. After subsequent reduction, as in previous Examples, a high yield of a tri-chlorobenzene thiol ($Cl_3C_6H_2SH$) mixture containing a small amount of the di-chloro derivative was obtained.

It was found that $2,4,6-Cl_3C_6H_2SH$ formed a major part of the tri-chloro material; the presence of some $2,4,5-Cl_3C_6H_2SH$ also was detected. A certain amount of the tetra-chloro derivative was also found.

Example 5

The process was carried out as in Example 1, except that antimony pentachloride was used as catalyst. A yield of about 74% of $ClC_6H_4SH$ was obtained. With iodine as catalyst, the yield of $ClC_6H_4SH$ was about 83%. With benzenesulphonic acid as catalyst, the process gave a high yield of a thiol product which was found to consist of $ClC_6H_4SH$ and $C_6H_5SH$ in a ratio of about 3 to 1. With mixed alkane sulphonic acid as catalyst, the process gave an 83% yield of thiol product, found to consist of $ClC_6H_4SH$ to the extent of 99%, the remainder being $C_6H_5SH$.

Example 6

The process carried out as in Example 1, but without catalyst, necessitated the extension of the reaction time to days instead of hours. A 54% yield of $ClC_6H_4SH$ was obtained.

Example 7

The process was carried out as in Example 1, but using sulphuryl chloride as the halogenating agent, gave a 75% yield of $ClC_6H_4SH$.

Example 8

The process was carried out as in Example 2, but using bromine as the halogenating agent. Liquid bromine was slowly added with stirring to 55 g. of $C_6H_5SH$ containing 1 g. fuming $H_2SO_4$ (30%). The amount of bromine added was in small excess over that required to form $BrC_6H_4SBr$. After addition, stirring was continued for 3 hours. The sulphenyl bromide was worked up, as usual, with zinc and acetic acid. The yield was 89% of $p-BrC_6H_4SH$, M. 74°–75°, further identified via its acetic acid derivative $BrC_6H-SCH_2COOH$, M. 117°–118°.

Example 9

The process carried out as in Example 3, using p-chlorobenzenesulphonic acid as catalyst, gave a 95% yield of a thiol product, which was found to consist of a trace of $C_6H_5SH$, 33% $ClC_6H_4SH$, 60% $Cl_2C_6H_3SH$, and 6% $Cl_3C_6H_2SH$.

Example 10

The process carried out as in Example 3, using $o-ClC_6H_4SH$ or $p-ClC_6H_4SH$ as substrate, gave very high yields of thiol product in which the $Cl_2C_6H_3SH$ content was 63% and 85% respectively. Such $Cl_2C_6H_3SH$ was found to have the same isomer composition as that shown in Example 3, i.e. it was almost wholly the $2,4-Cl_2$ isomer.

Example 11

The process carried out as in Example 4, using $m-ClC_6H_4SH$ as substrate, gave a 78% yield of thiol product which was found to be largely the $2,4,5-Cl_3C_6H_2SH$ isomer.

Example 12

The process carried out as in Example 2, using o-thiocresol as substrate, gave an 83% yield of thiol product which proved to consist of 75% mono-chloro- and 25% di-chloro-o-thiocresol. The mono-chloro product had its Cl atom in position para to S and was identified by its $SCH_2COOH$ derivative, M. 119°–120°, as well as with the aid of infra-red and vapor phase chromatography. A similar run of p-thiocresol gave a thiol product consisting of 18% p-thiocresol, 68% mono-chloro-p-thiocresol, 10% di-chloro-p-thiocresol, plus higher boiling compounds. The mono-chloro product had its Cl atom ortho to S.

Example 13

The process was carried out in accordance with Example 2 using sufficient chlorine for penta-chloro substitution. A yield of 61% of pentachloro-benzene thiol, $C_6Cl_5SH$, was obtained.

What I claim is:

1. The method of preparing ring-halogenated mononuclear aromatic sulphenyl halides comprising subjecting a compound of the class consisting of aryl-thiols and di-aryl-disulphides having respectively the general formulae ArSH and ArS-SAr' wherein Ar and Ar' represent mononuclear aryl radicals and wherein Ar may be the same as Ar', in an anhydrous medium, to a reaction with a halogenating agent in the presence of a catalyst of the group consisting of halogen carriers, sulphuric acid and a sulphonic acid, and maintaining the reaction until a halogenated sulphenyl halide of a controlled degree of ring halogenation between 1 and 5 has been formed.

2. The method of claim 1 wherein the halogenating agent is one of the group consisting of gaseous chlorine and sulphuryl chloride.

3. The method of claim 1 wherein the halogenating agent is bromine.

4. The method of preparing ring-chlorinated mononuclear aromatic sulphenyl chlorides comprising dissolving in an anhydrous medium substantially inert to chlorine a compound of the class consisting of aryl-thiols and diaryl-disulphides having respectively the general formulae ArSH and ArS-SAr' wherein Ar and Ar' represent mononuclear aryl radicals, and wherein Ar may be the same as Ar', passing gaseous chlorine through the solution in the presence of a catalyst of the group consisting of halogen carriers, sulphuric acid and a sulphonic acid, and continuing the passage of chlorine until a chlorinated sulphenyl chloride having a controlled degree of ring chlorination between 1 and 5 has been formed.

5. The method of claim 4 wherein the catalyst is one of the group consisting of fuming sulphuric acid, iodine, benzene-sulphonic acid, p-chlorobenzene-sulphonic acid, alkane sulphonic acid and antimony pentachloride.

6. The method of claim 4 wherein Ar and Ar' represent aromatic radicals of the group consisting of phenyl, nitro-phenyl, lower alkyl-phenyl, chloro-alkyl-phenyl, halogen-substituted phenyl, chlorosulphenyl-substituted phenyl, chloro-carbonyl-substituted phenyl and acetamino-substituted phenyl.

7. The method of claim 4 wherein the starting material is a compound of the group consisting of benzene-thiol, chlorobenzene-thiol, thiocresol and diphenyl-disulphide, and the product is a ring-chlorinated sulphenyl chloride having a degree of ring chlorination higher than the starting material.

8. The method of claim 4 wherein the resulting chlorinated sulphenyl chloride has a degree of ring chlorination between 2 and 5.

9. The method of claim 4 wherein the reaction is carried out at a temperature between room temperature and about 80° C.

10. The method of claim 4 wherein reaction is carried out at a temperature between room temperature and about 80° C. and wherein the resulting chlorinated sulphenyl chloride has a degree of ring chlorination of between 2 and 5.

11. A method as defined in claim 1 wherein the resulting halogenated sulphenyl halide has a degree of ring chlorination of between 2 and 5.

12. A method as defined in claim 1 wherein the reaction is carried out at a temperature between room temperature and 80° C.

13. A method as defined in claim 1 wherein the reaction is carried out at a temperature between room temperature and 80° C. and wherein the resulting halogenated sulphenyl halide has a degree of ring halogenation between 2 and 5.

References Cited
FOREIGN PATENTS 228,901  11/1910  Germany.

OTHER REFERENCES

Schiller et al.: Berichte deut. Chem. vol. 9, pp. 1637–1638 (1876).

Beilstein.: Handb. Org. Chemie Hauptw., vol. 6, p. 335.

Houben-Weyl: (I) Methoden Org. Chem., vol. 9, pp. 23–27 (1955).

Houben-Weyl: (II) Methoden Org. Chem., vol. V/3 p. 714.

LORRAINE A. WEINBERGER, Primary Examiner

HAROLD C. WEGNER, Assistant Examiner

U.S. Cl. X.R.

260—516, 544, 590, 607, 608, 609